United States Patent [19]

Cummings

[11] Patent Number: 5,569,849
[45] Date of Patent: Oct. 29, 1996

[54] VISUAL TIRE CAP PRESSURE GAUGE

[76] Inventor: Craig Cummings, 73-1126 Ahulani St., Kailua-Kona, Hi. 96740

[21] Appl. No.: 518,681

[22] Filed: Aug. 24, 1995

[51] Int. Cl.[6] .................................................. B60C 23/02
[52] U.S. Cl. ...................... 73/146.8; 73/146.3; 137/227; 116/34 R
[58] Field of Search ................................ 73/146.3, 146.8; 137/226, 227; 116/34 R

[56] References Cited

U.S. PATENT DOCUMENTS

| | | | |
|---|---|---|---|
| 2,938,379 | 4/1958 | Reh | 73/146.8 |
| 3,241,514 | 10/1964 | Grimland | 73/146.3 |
| 3,452,708 | 7/1969 | Richardson | 73/146.8 |
| 3,780,693 | 12/1973 | Parr . | |
| 3,799,108 | 3/1974 | Moscow | 116/114 |
| 3,964,299 | 6/1976 | Johnson | 73/762 |
| 4,002,139 | 1/1977 | Payne | 116/114 |
| 4,103,549 | 8/1978 | Schmidt . | |
| 4,174,673 | 11/1979 | Tung et al. . | |
| 4,203,467 | 5/1980 | Cardi | 137/557 |
| 4,244,214 | 1/1981 | Curran . | |
| 4,464,929 | 8/1984 | Willis . | |
| 4,606,391 | 8/1986 | Achterholt | 152/431 |
| 5,007,365 | 4/1991 | Hwang | 116/34 |
| 5,014,643 | 5/1991 | Huang | 116/34 |
| 5,115,832 | 5/1992 | Higdon et al. | 137/227 |
| 5,365,967 | 11/1994 | Moore | 137/226 |

*Primary Examiner*—Richard Chilcot
*Assistant Examiner*—Paul D. Amrozowicz
*Attorney, Agent, or Firm*—Michael I. Kroll

[57] ABSTRACT

A visual tire cap pressure gauge which comprises a cap member. A structure within the cap member is for securing the cap member to a valve stem on a tire in a motor vehicle. A lens is mounted in a top end of the cap member. An assembly within the cap member is for visually indicating when air pressure within the tire drops below a set point, so as to enable a person at a glance to tell if the tire needs more air.

1 Claim, 2 Drawing Sheets

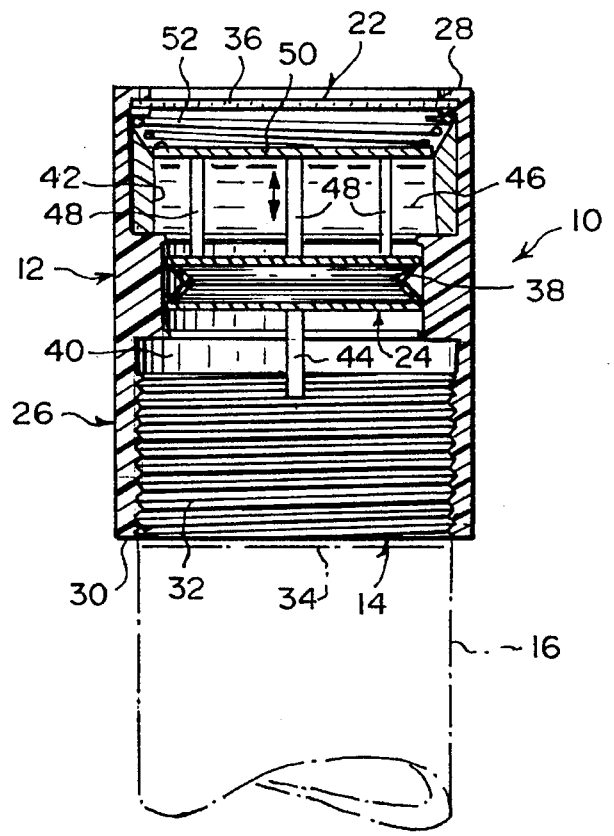
Fig.3
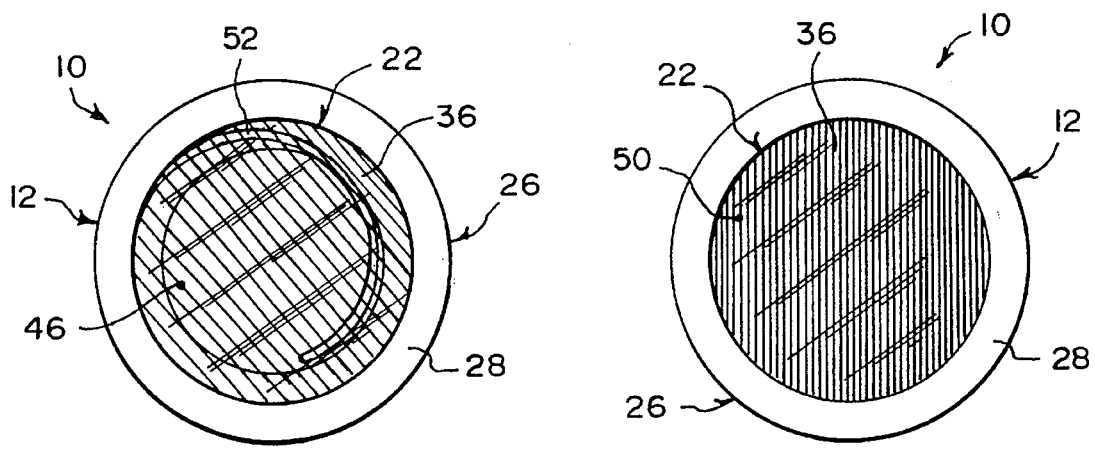
Fig.4
(BELOW SET POINT)
Fig.5
(AT SET POINT OR ABOVE)

VISUAL TIRE CAP PRESSURE GAUGE

BACKGROUND OF THE INVENTION

1. Field of the Invention

The instant invention relates generally to pressure indicating devices and more specifically it relates to a visual tire cap pressure gauge.

2. Description of the Prior Art

Numerous pressure indicating devices. For example, U.S. Pat. Nos. 3,780,693 to Parr; 4,013,549 to Schmidt; 4,174,673 to Tung et al.; 4,244,214 to Curran; 4,464,929 to Willis and 5,115,832 to Higdon et al. all are illustrative of such prior art. While these units may be suitable for the particular purpose to which they address, they would not be as suitable for the purposes of the present invention as heretofore described.

PARR, EDWARD L.

VISIBLE FLUID PRESSURE INDICATOR

U.S. Pat. No. 3,780,693

An indicator including a casing having a coupling connected with a source of fluid and a cap for the coupling, the cap having a window. The indicator also includes a closed, expansible and contractible container that is disposed within the cap, part of the container being visible through the window.

SCHMIDT, HELMUT

TIRE VALVE CAP WITH PRESSURE INDICATOR

U.S. Pat. No. 4,103,549

A tire valve cap with a built-in pressure indicator consisting of a housing structure with a spring-loaded diaphragm piston exposed to the tire pressure, the axial movements of the hub of the diaphragm piston being converted into angular movements of a pointer shaft and pointer member through a helical cam connection. The position of the fixed pointer is adjustable, and the pointers are radial protrusions whose position can be ascertained visually or by finger touch.

TUNG, WEI-LING

KWAN, STEVEN

LOW PRESSURE WARNING TIRE AIR VALVE CAP

U.S. Pat. No. 4,174,673

A low pressure warning cap for a pneumatic tire air valve including a generally cylindrical body having first and second ends. A cylinder is adjacent the first end. A threaded connector is for attachment to a conventional air valve stem of a pneumatic tire at the second end. An acting chamber connects with and is disposed intermediate the cylinder and the threaded connector. A piston is disposed in the cylinder and is resiliently biased toward the acting chamber. The cylinder has an opening at the first end. A deformable diaphragm is disposed across the acting chamber between the threaded connector and the enlarged end. A perforated diaphragm is disposed across the cylinder adjacent the opening. An elastic sack envelopes in an air tight manner the first end including the opening. A protuberance in the threaded connector cooperates with the valve to open the valve upon attachment of the cap to valve. At a desired tire pressure, the deformable diaphragm is deformed by air from at the desired pressure to move the piston against the bias into air-tight engagement with the body, to prevent passage of the air into the cylinder. Upon the occurrence thereafter of an undesirably low tire pressure, the piston is biased against this undersirably low air pressure, to allow the air into the cylinder past the piston to pass by way of the perforated diaphragm and opens to inflate and rupture the sack to provide an audible indication of the undesirably low tire pressure.

CURRAN, WILLIAM F.

VISUAL TIRE VALVE

U.S. Pat. No. 4,244,214

A visual tire valve is adapted for mounting over a tire valve stem. An apertured stem housing at one end mounted upon the valve stem, has an elongated bore intermediate its ends. A barrel has a counterbore. A stem member at its other end has a normally closed longitudinal bore whose inner end communicates with the counterbore and whose outer end communicates with the atmosphere. An axially apertured bolt is slidably nested within the elongated bore and has three annular bands of different colors upon its exterior for indicating over inflation, proper inflation and under inflation with respect to a window in the stem housing. A spring is interposed in compression between the bolt and stem member. A normally seated spring-biased air flow control rod is disposed within the stem member closing off air communication therethrough. A normally seated valve within the bolt is adapted to prevent passage of air therethrough in one direction. With the bolt biasing spring precalibrated for a preset tire pressure, the bolt color bands automatically indicate through the window tire air pressure as below, above or the same as the preset tire pressure.

WILLIS, WILLIAM M.

TIRE CAP PRESSURE GAUGE

U.S. Pat. No. 4,464,920

A tire cap pressure gauge for mounting upon a tire valve stem and measuring tire pressure has a housing. a manually operated plunger extends axially through the housing. A spring extends about the plunger. A piston is biased by the spring and has indicia. A transparent insert member contains the spring, piston and plunger within the housing and has an internally threaded bore for mounting about the periphery of a threaded valve stem. The housing has multiple windows with indicia proximate thereto for viewing the translational position of the piston through the transparent insert member. Two embodiments show a lightweight, compact and easily assembled pressure measuring cap having sealless construction which utilizes close clearances and sharp corners to minimize leakage airflow. A small but insignificant amount of air leaks past the piston, providing an audible signal that the plunger is sufficiently depressed to provide an adequate pressure reading. One embodiment is adaptable to two ranges of use, automobile tire pressure and truck tire pressures, by merely changing the orientation of the plunger thereby changing the effective pressure biasing area of the piston.

HIGDON, JOHN S.

CAPEN, DOUGLAS W.

TIRE PRESSURE GAUGE AND CAP APPARATUS

U.S. Pat. No. 5,115,832

An apparatus including a body tube coaxially mounting an internally threaded lower cylindrical skirt at a lower terminal end thereof for securement to a valve member of a conventional automotive tire. An apertured cylindrical web is mounted adjacent an intersection of the tube and cylindrical skirt, including an axial rod fixedly mounted projecting coaxially of the skirt for projection and depressing of a central displacement needle seat, as utilized in automotive valves. A flexible web formed of memory retentent material is mounted adjacent an upper terminal end of the tube below a translucent viewing lens. The web includes a rigid boss member mounted thereon. Proper inflation permits projection of the boss against the translucent lens for viewing of the boss' indicia of proper inflation. Deflation permits the web to deflect and displace the boss relative to the lens and provides visual indication of underinflated condition.

SUMMARY OF THE INVENTION

A primary object of the present invention is to provide a visual tire cap pressure gauge that will overcome the shortcomings of the prior art devices.

Another object is to provide a visual tire cap pressure gauge that is threaded onto a valve stem which will automatically change color when a tire looses a sufficient amount of air pressure, so that it would enable a person at a glance to tell if the tire needs air.

An additional object is to provide a visual tire cap pressure gauge that could be used for passenger, as well as commercial vehicles, and would be an early warning system devised to save fuel, as well as possibly saving lives.

A further object is to provide a visual tire cap pressure gauge that is simple and easy to use.

A still further object is to provide a visual tire cap pressure gauge that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a cross sectional view taken along line 3—3 in FIG. 2.

FIG. 4 is a top view taken in the direction of arrow 4 in FIG. 2, showing visually the tire pressure below a set point.

FIG. 5 is a top view similar to FIG. 4, showing visually the tire pressure at the set point or above.

Similar reference characters denote corresponding features consistently throughout the attached drawings.

DETAILED DESCRIPTION OF THE PREFERRED EMBODIMENTS

Figure 1:
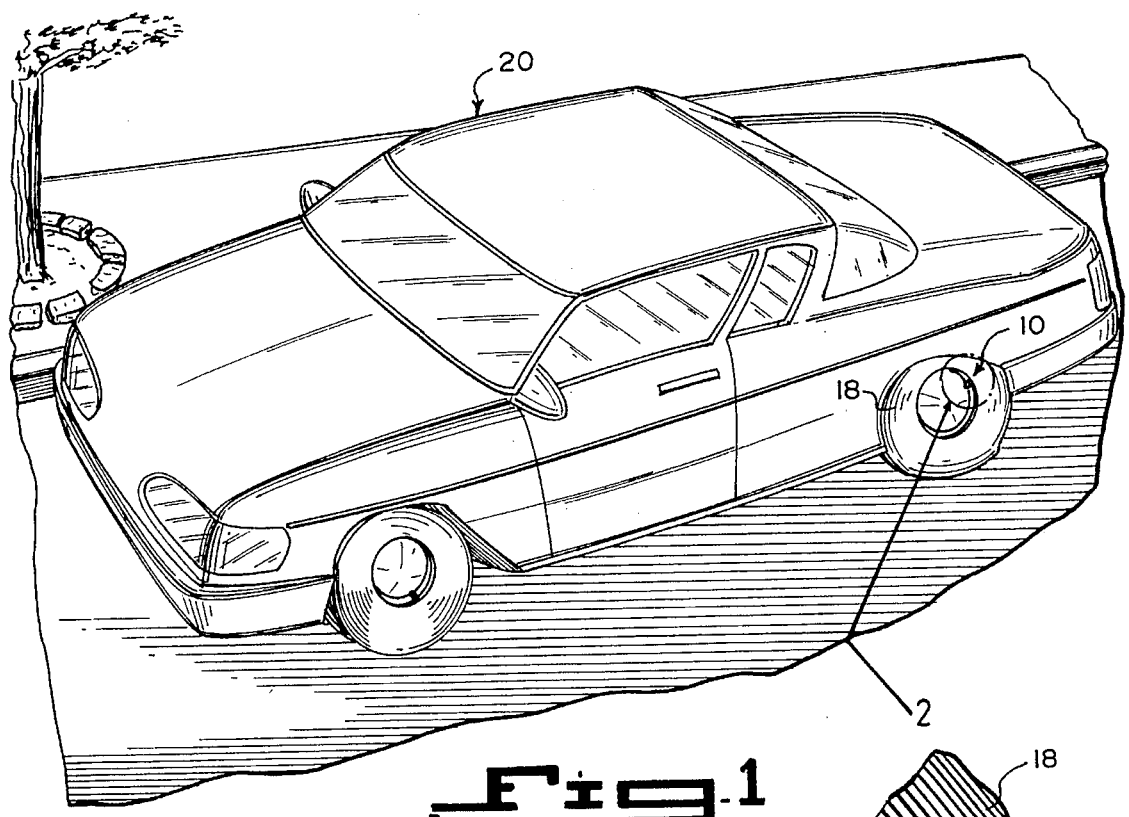
FIG. 1 is a perspective view of a motor vehicle, showing the instant invention installed and in use.
Figure 2:
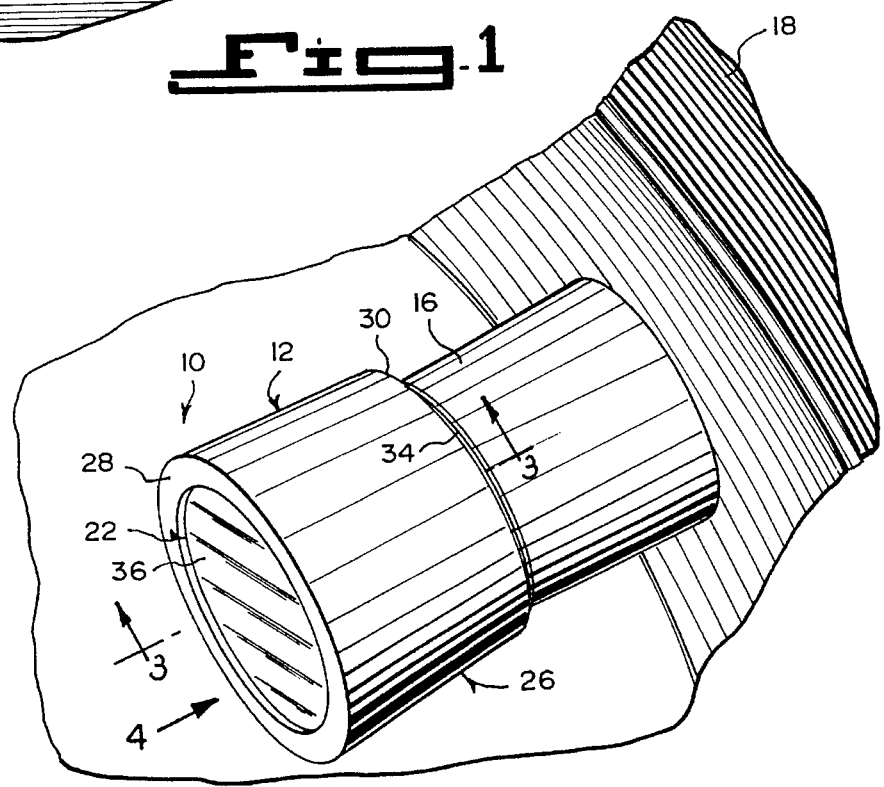
FIG. 2 is an enlarged perspective view as indicated by arrow 2 in FIG. 1, showing the instant invention mounted on a valve stem.

Turning now descriptively to the drawings, in which similar reference characters denote similar elements throughout the several views, FIGS. 1 through 5 illustrate a visual tire cap pressure gauge 10, which comprises a cap member 12. A structure 14 within the cap member 12 is for securing the cap member 12 to a valve stem 16 on a tire 18 in a motor vehicle 20. A lens 22 is mounted in a top end of the cap member 12. An assembly 24 within the cap member 12 is for visually indicating when air pressure within the tire 18 drops below a set point, so as to enable a person at a glance to tell if the tire 18 needs more air.

The cap member 12 is a cylindrical hollow housing 26 having an open top end 28 and an open bottom end 30. The securing structure is internal threads 32 located within the open bottom end 30 of the cylindrical hollow housing 26 which can thread onto a threaded portion 34 of the valve stem 16. The lens 22 is a transparent disc-shaped cover 36 sealed within the open top end 28 of the cylindrical hollow housing 26, to allow the person to look through the cover 36 and into the cylindrical hollow housing 26.

The visual indicating assembly 24 includes a diaphragm 38 mounted within the cylindrical hollow housing 26, so as to divide the cylindrical hollow housing 26 into a lower chamber 40 and an upper chamber 42. A valve depressor rod 44 extends downwardly from a bottom surface of the diaphragm 38 into the lower chamber 40. The rod 44 will make contact with the valve stem 16 and release the pressurized air from the tire 18 into the lower chamber 40, so as to deflect the diaphragm 38 upwardly into the upper chamber 42 when the air pressure is at the set point.

A bright colored fluid 46 is carried within the upper chamber 42 which can be readily seen through the lens 22. A plurality of rods 48 extend upwardly from a top surface of the diaphragm 38 into the upper chamber 42. A dark colored plate 50 is affixed to top ends of the rods 48, slightly below the lens 22 in the upper chamber 42.

A coil spring 52 is between the dark colored plate 50 and the lens 22 in the upper chamber 42, to normally bias the dark colored plate 50 downwardly away from the lens 22. In a first instance, as shown in FIG. 5, when the air pressure in the tire 18 is at the set point, the dark colored plate 50 will move up towards the lens 22 and be viewed by the person when the diaphragm 38 deflects upwardly.

In a second instance, as shown in FIGS. 3 and 4, when the air pressure in the tire 18 is below the set point, the coil spring 52 will push the dark colored plate 50 away from the lens 22 allowing the person to view the bright colored fluid 46 within the upper chamber 42, thereby indicating that the air pressure in the tire 18 has dropped below the set point.

OPERATION OF THE INVENTION

To use the visual tire cap pressure gauge 10, the following steps should be taken:

1. Screw the cap member 12 onto the valve stem 16, so that the internal threads 32 located within the open bottom end 30 of the cylindrical hollow housing 26 will thread onto the threaded portion 34 of the valve stem 16.
2. Make sure that the valve depressor rod 44 makes contact with the valve stem 16, to release the pressurized air from the tire 18.
3. The diaphragm 38 will deflect upwardly into the upper chamber 42 when the air pressure is at the set point, thereby cause the dark colored plate 50 to move up towards the lens 22 and be viewed by the person.
4. The diaphragm 38 will not deflect upwardly into the upper chamber 42 when the air pressure is below the set point, thereby causing the dark colored plate 50 to move away from the lens 22 by the help of the coil spring 52.
5. The bright colored fluid can now be seen through the lens 22 by the person to visually indicate that the tire 18 needs more air.

LIST OF REFERENCE NUMBERS 10 visual tire cap pressure gauge
12 cap member of 10
14 securing structure in 12
16 valve stem on 18
18 tire in 20
20 motor vehicle
22 lens in 12
24 visually indicating assembly
26 cylindrical hollow housing of 12
28 open top end of 26
30 open bottom end of 26
32 internal threads in 30
34 threaded portion of 16
36 transparent disc-shaped cover for 22
38 diaphragm in 26
40 lower chamber of 26
42 upper chamber of 26
44 valve depressor rod on 38
46 bright colored fluid in 42
48 rod on 38
50 dark colored plate on 48
52 coil spring in 42

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A sealed visual tire cap pressure gauge which comprises:
   a) a cap member consisting of a cylindrical hollow housing having an open top end and an open bottom end;
   b) means within said cap member comprising internal threads located within the open bottom thereof for engaging the threaded portion of the valve stem, for securing said cap member to a valve stem on a tire in a motor vehicle;
   c) a disc-shaped transparent lens sealed and mounted in the top end of said cap member to allow the person to look through said cover into said cylindrical hollow housing; and
   d) means within said cap member for visually indicating when air pressure within the tire drops below a set point, so as to enable a person at a glance to tell if the tire needs more air, said visually indicating means comprising a diaphram mounted within said cylindrical housing dividing said cylindrical hollow housing into a lower chamber and an upper chamber, a valve depressor rod extending down from a bottom surface of said diaphragm into said lower chamber to make contact with the valve stem to release the pressurized air from the tire into said lower chamber to deflect said diaphragm upwardly into said upper chamber when the air pressure is at the set point, a bright colored fluid within said upper chamber which can be readily seen through said lens, a plurality of rods extending upwardly from a top surface of said diaphragm into said upper chamber, a dark colored plate affixed to the top ends of said rods within said upper chamber and below the underside of said lens, and spring means comprising a coil spring between said dark colored plate and said lens in said upper chamber to normally bias said dark colored plate downwardly away from said lens, so that in a first instance when the air pressure is at the set point said dark colored plate will move up towards said lens and be viewed by the person when said diaphragm deflects upwardly, and in a second instance when the air pressure in the tire is below the set point, said coil spring pushing said dark colored plate away from said lens allowing the person to view the bright colored fluid within said upper chamber indicating that the air pressure in the tire has dropped below the set point.

\* \* \* \* \*